(12) United States Patent
Ma (10) Patent No.: US 9,052,019 B2
(45) Date of Patent: Jun. 9, 2015

(54) ELECTRIC FLOATING BALL VALVE

(75) Inventor: Kaicong Ma, Zhejiang Province (CN)

(73) Assignee: Taizhou Guanghui Automatic Control Sci-Tec Co., Ltd., Shamen (CN)

( * ) Notice: Subject to any disclaimer, the term of this patent is extended or adjusted under 35 U.S.C. 154(b) by 759 days.

(21) Appl. No.: 13/295,074

(22) Filed: Nov. 13, 2011

(65) Prior Publication Data

US 2012/0298902 A1    Nov. 29, 2012

(30) Foreign Application Priority Data

Apr. 12, 2011  (CN) .......................... 2011 1 0090634
Jul. 22, 2011   (WO) ................. PCT/CN2011/077507

(51) Int. Cl.
  *F16K 49/00*    (2006.01)
  *F16K 5/06*     (2006.01)
  *F16K 31/04*    (2006.01)

(52) U.S. Cl.
  CPC ............... *F16K 5/0652* (2013.01); *F16K 49/00* (2013.01); *F16K 31/043* (2013.01)

(58) Field of Classification Search
  USPC ................ 137/334, 338; 251/315.14, 129.11; 165/80.3, 185
  See application file for complete search history.

(56) References Cited

U.S. PATENT DOCUMENTS

| | | | |
|---|---|---|---|
| 1,697,608 A * | 1/1929 | Patterson ....................... 251/161 |
| 2,351,613 A * | 6/1944 | Hopkins ................... 137/625.46 |
| 3,642,024 A * | 2/1972 | La Coste et al. ............... 137/340 |
| 3,979,104 A * | 9/1976 | LaCoste et al. ................ 251/214 |
| 4,047,275 A * | 9/1977 | Bake et al. ................ 29/890.127 |
| 5,975,118 A * | 11/1999 | Ulicny et al. .................. 137/338 |
| 7,347,408 B2 * | 3/2008 | Keiser ...................... 251/315.08 |
| 2005/0184265 A1 * | 8/2005 | Aoki et al. ..................... 251/248 |
| 2008/0047618 A1 * | 2/2008 | Ishikawa ....................... 137/505 |
| 2009/0321674 A1 * | 12/2009 | Madden et al. ............... 251/313 |

FOREIGN PATENT DOCUMENTS

CN    2536856 Y    2/2003
FR    2111987 A1 *  6/1972

* cited by examiner

*Primary Examiner* — John K Fristoe, Jr.
*Assistant Examiner* — Jonathan Waddy
(74) *Attorney, Agent, or Firm* — Minder Law Group; Willy H. Wong (57) ABSTRACT

The present invention discloses an electric floating ball valve. The electric floating ball valve addresses the problems of the existing electric floating ball valve, such as poor reliability, high tendency to be damaged, poor control precision, high noises in operation as well as high costs for maintenance and replacement. The electric floating ball valve includes a valve body, a valve stem, a valve core and a drive mechanism. The drive mechanism is connected with the outer end of the valve stem and could drive the said valve stem to rotate. The external side of the valve stem is covered with a cylindrical heat sink made of metallic materials. Said heat sink is fixedly connected with said valve body. The heat sink of the electric floating valve could significantly improve the heat radiation capacity, which efficiently guarantees the stable and reliable operation of the drive mechanism.

3 Claims, 8 Drawing Sheets

ELECTRIC FLOATING BALL VALVE

BACKGROUND OF THE INVENTION

1. Field of Invention

The present invention relates to a high and low temperature resistant floating ball valve for heating ventilation air conditioning pipelines in the filed of heating ventilation air conditioning temperature control.

2. Related Art

A large number of modernized office buildings and malls have been continuously set up with the development of urbanization of the country. Central air conditioning systems on the one hand provide comfortable environment required for people's working and living demands, and on the other hand take great energy consumption. According to the relevant statistics, the energy consumption of the air conditioning system takes up 50-60% of the total energy consumption of the buildings, takes up one third of the total electric load of the whole city during the peak load in summer, which case is still getting more and more serious. It is mentioned in the Guideline for the Eleventh Five-Year Plan that a society of resources-saving and environment-friendly buildings should be established in the country. It is said that the GDP unit consumption shall be decreased by 20% as of 2010. The energy saving technology for central air conditioners is one of ten energy saving engineering technologies proposed by the National Committee of Development and Reform.

At present, the central air conditioning systems reconfigure the energy saving of the transportation system of the air-conditioners by employing variable flow control, wind control and large temperature differences, for the purpose of reducing the energy consumption of the air conditioners. The electric control valve is the core operating part of the central air conditioning systems of variable flow control, which could automatically adjust the valve opening on the basis of the changes of the stability control signals of the target areas, so as to change the water flow rates and finally accomplish precise temperature control. The waterways required to be adjusted via electric valves include, throughout the whole central air conditioning systems, refrigerant loops, fan coils and new fan groups at the end of cool (hot) medium water, cooling water control loops, heat exchange control loops, steam control loops, and so on. The electric control valves do not display a good performance, which not only degrades the temperature control precision and negative affects the comforts of people, but also decrease the stability of the systems themselves. The electric control valves currently used have numerous disadvantages such as poor reliability, poor sealing property, high tendency to be damaged, high tendency in running, emitting, dropping and leaking, poor control precision, high noises in operation as well as high costs for maintenance and replacement. The energy saving effect of the central air conditioning systems is seriously influenced attributing to the aforementioned disadvantages.

The conventional valves generally include normal temperature valves and could not be employed in high temperature pipelines, for example pipelines in steam systems. The electric floating ball valves are thus proposed to address said problem, which are made of steel materials and could achieve the purpose of stably opening and closing in the pipeline systems of high temperature mediums.

In the conventional electric floating ball valves, the parts for controlling the action of the valve cores are implemented with the electric actuators including motors and transmission gear units. The motors are connected with the input ends of the transmission gear units, and the output ends of the transmission gear units are connected with the valve stems of the electric floating ball valves. The valve stems are driven to rotate by the motors through the transmission gear units so at to open and close the valves, when the valves are to be opened or closed.

However, as the electric floating ball valves are used in high temperature pipeline systems, the heat would be quickly transferred from the valve stems to the transmission gear units and motors. It is obvious that the transmission power of the transmission gear units is influenced by the over high temperature, and the use life of the motors would be influenced by the over high temperature at the motors. The other existing electric valves also have similar pitfalls.

SUMMARY OF THE INVENTION

One object of the present invention is to provide an electric floating ball valve with a high stability in use and a simple structure, to address the aforesaid problems existing in the prior art.

The object of the invention could be achieved by an electric floating ball valve including a valve body, a valve stem, a valve core and a drive mechanism. The valve core is positioned within the valve body. The drive mechanism is placed outside the valve body. Said valve stem passes through the valve body and the inner end of the valve stem is linked with the valve core. The drive mechanism is connected with the outer end of the valve stem and could drive the said valve stem to rotate. The external side of the valve stem is covered with a cylindrical heat sink made of metallic materials. Said heat sink is fixedly connected with said valve body.

The electric floating ball valve is mounted in the steam pipeline. The flow rate of steam in the pipeline could be controlled or cut off by opening and closing the electric floating ball valve. After the drive mechanism drives the valve stem to rotate, the valve core would rotate so as to maintain the valve body in the open or closed state.

According to the electric floating ball valve of the invention, the heat of the valve stem is quickly reduced through the heat sink, and thus the temperature of the drive mechanism is decreased and the operational stability of the drive mechanism is improved. On the other hand, the stability of the electric floating ball valve is enhanced in use as a whole.

According to the electric floating ball valve of the invention, the heat sink includes a cylindrical body and several radiating fins on the external side of the body.

The cylindrical body is completely covered on the external side of the valve stem. Once the heat of the valve stem is transmitted to the body, the heat of the body could be quickly emitted by the several radiating fins in an efficient manner.

According to the electric floating ball valve of the invention, the radiating fins are annular and protrude along the circumference of the body.

In another embodiment of the invention, the radiating fins are strip-shaped and protrude along the axial direction of the body in said electric floating ball valve.

The protruded radiating fins could rapidly reduce the heat of the body in an efficient manner.

According to the electric floating ball valve of the invention, the drive mechanism includes a housing, a motor provided within the housing and a transmission gear unit. The motor is connected with the input end of the transmission gear unit and the output end of the transmission gear unit is connected with the valve stem.

The motor has a fixed rotation speed. The valve stem could obtain a required rotation speed via the gear unit.

According to the electric floating ball valve of the invention, the housing has an upper housing part and a lower housing part. A sealed cavity is formed between the upper housing part and the lower housing, part after the upper housing part is connected to the lower housing part.

According to the electric floating ball valve of the invention, a seal washer is provided at the connection of the upper housing part and the lower housing part. The seal washer is used to seal between the upper housing part and the lower housing part, to locate the motor, the transmission gear unit and so on in the sealed housing. Such a structure could prevent fogging arising from the collision of high and low temperatures, and thus avoid the internal short circuit.

According to the electric floating ball valve of the invention, a bearing is provided between said lower housing part and the valve stem, and a seal ring is located between the inner side of the bearing and the valve stem. Such a configuration could reduce the abrasion of the valve stem. Meanwhile, the seal ring between the bearing and the valve stem could achieve the purpose of sealing, to ensure the motor is in kept in the sealing state and as such could be employed in relatively moist environment.

According to the electric floating ball valve of the invention, a mounting hole is provided at the housing. The second end of the body other than the first one fixed to the valve body is placed at the mounting hole. A clip connector is provided between the housing and the body, which could fixedly connect the two.

The second end of the body is preliminarily positioned via the mounting hole. Then the housing is stably connected with the heat sink body through the clip connector.

According to the electric floating ball valve of the invention, a notch concave in the axial direction is provided on the wall of the mounting hole of the housing. A projected shoulder is set on the external side at the second end of the body and is matched with the notch. Said clip connecter extends through the notch, and the shoulder is positioned between the housing and the clip connector.

When the second end of the body is embedded into the mounting hole, the shoulder is embedded into the notch so that the body and the housing are circumferentially fixed. The clip connector is so connected that the shoulder is positioned between the housing and the clip connector, and thus the body is axially fixed to the housing. It is obvious that the body is fixed to the housing both circumferentially and axially after the clip connector is connected.

According to the electric floating ball valve of the invention, a projected edge is located at the external side of the housing corresponding to the notch. The said clip connector is U-shaped and elastic. A connecting part for extending through the notch is set at one side of the opening of the clip connector, and a press fitting element is set at the other side of the opening of the clip connector, which is matched with the projected edge.

The press fitting element of the clip connector is embedded onto the projected edge after the clip connector is connected. And, due to the elasticity of the clip connector, the press fitting element of the clip connector is embedded onto the projected edge to be positioned.

Of course, an external force could be directly applied to stretch out the U-shaped opening of the clip connector during disassembling, so as to take the clip connector away in a convenient manner.

According to the electric floating ball valve of the invention, the clip connector is made of metallic materials.

The clip connector made of metallic materials has some elasticity by itself.

In the other embodiment of the invention, the clip connector is made from plastic materials in said electric floating ball valve.

The clip connector made from plastic materials has some elasticity by itself.

According to the electric floating ball valve of the invention, the heat sink has a length of 8-15 centimeters.

According to the electric floating ball valve of the invention, the heat sink has 6-10 radiating fins thereon with the spacing between two adjacent radiating fins being centimeters.

According to the electric floating ball valve of the invention, a gasket is provided between the valve core and the valve body. An extending through hole for passing the medium is provided at the center of the valve core. A pressure discharge hole is set in the valve core, for communicating the through hole with the internal cavity of the valve body.

The cavity between the valve body and the valve core is in communication via the pressure discharge hole and the through hole. Such a configuration is explosion proof. In other words, the cool medium existing between the valve body and the valve core used in the hot medium process control, prevents the said cavity from being exploded or damaging the seal washer between the valve core and the valve body after the pressure of the cavity enlarges once it is heated by the passing hot medium.

According to the electric floating ball valve of the invention, the valve stem has a projected seal step thereon. A seal seat is provided within the valve body corresponding to the seal step. A seal ring is covered on the valve stem and placed between the seal step and the seal seat.

When the over high pressure at the through hole of the valve core makes the valve stem shift upwards, said seal ring is firmly pressed between the seal step and the seal seat. In other words, the larger the pressure within the valve core is, the sealing property between the valve stem and the valve body is better. The valve would be automatically pressed to be sealed. An auto-compensation function is provided between the valve stem and the valve body, eliminating the possibilities of running, emitting, dropping and leaking, so that the use life is extended.

According to the electric floating ball valve of the invention, the wire connected with the motor passes through said housing and a sealing element is located between the wire and the housing. The sealing element could be glue or a gasket made from rubber.

Compared with the prior art, when the electric floating ball valve is used for specific controls of high temperature steam, hot oil and ultra low temperature medium, the heat sink could significantly improve the heat radiation capacity, which efficiently guarantees the stable and reliable operation of the drive mechanism. It has been proved with on-site tests that the surface temperature at the bottom of the heat sink is about 70, that at the top thereof is approximately 50 and that of the drive mechanism is around 35 when the fluid used for control is steam of 180. That said, the heat sink could efficiently improve the operating conditions of the drive mechanism. Therefore, the stability of the electric floating ball valve is enhanced in use.

Meanwhile, the problem residing in the overly high pressure between the valve core and the valve body could be addressed by using the pressure discharge hole, which further improves the stability of the electric floating ball valve in use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
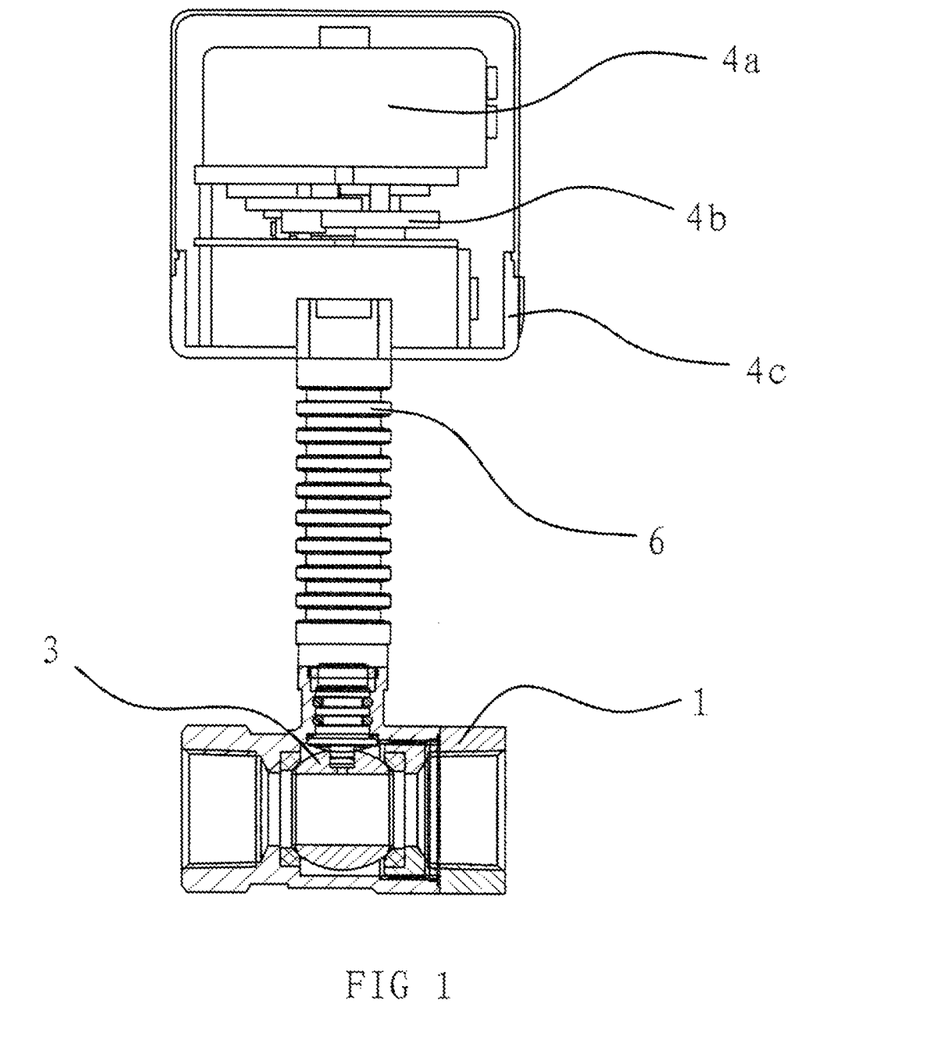
FIG. 1 is a sectional structural diagram of the drive mechanism of the electric floating ball valve according to the invention.

As shown in FIG. 1, the electric floating ball valve of the invention is mounted in the steam pipeline system, including a valve body 1, a valve stem 2, a valve core 3 and a drive mechanism 4.

Figure 2:
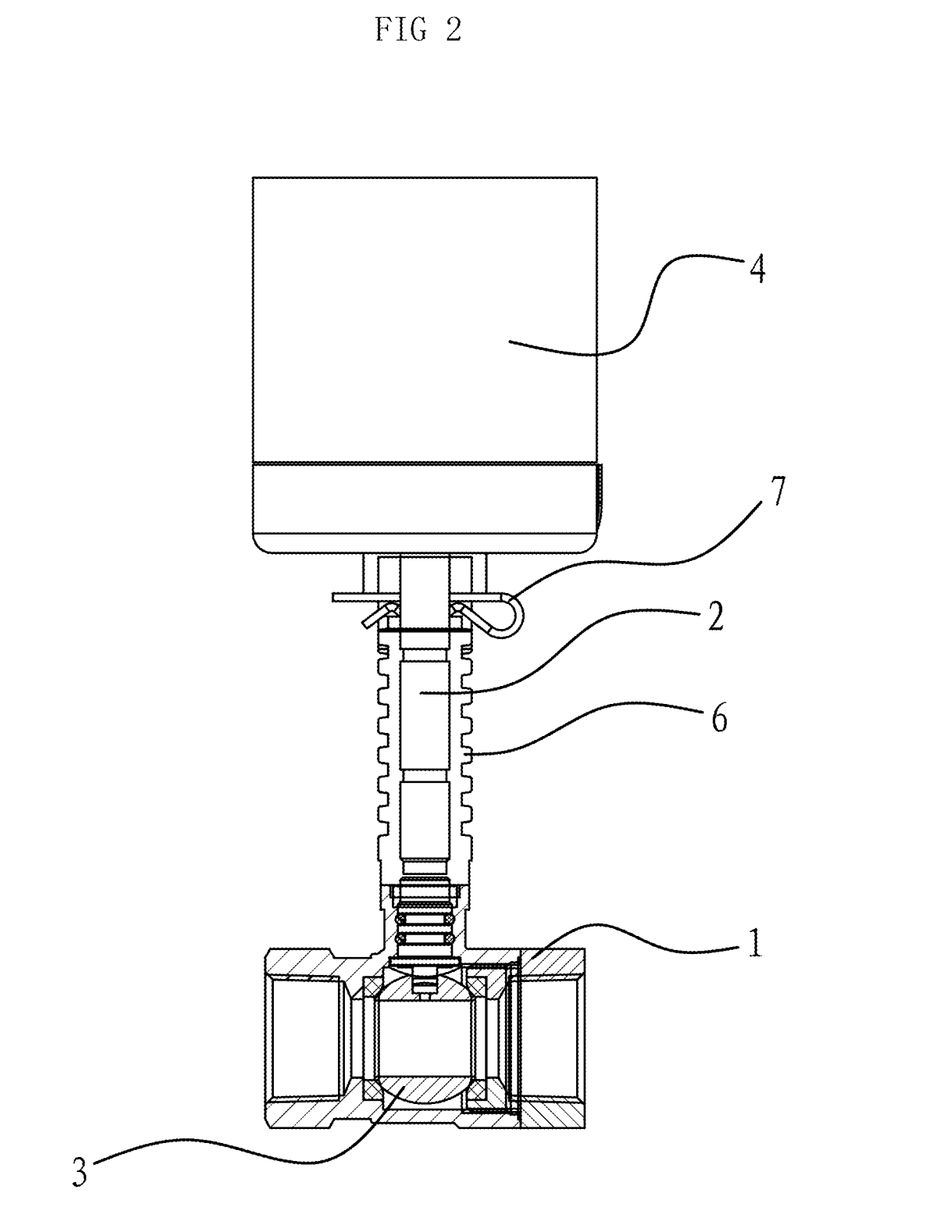
FIG. 2 is a sectional structural diagram of the heat sink of the electric floating ball valve according to the invention.
Figure 3:
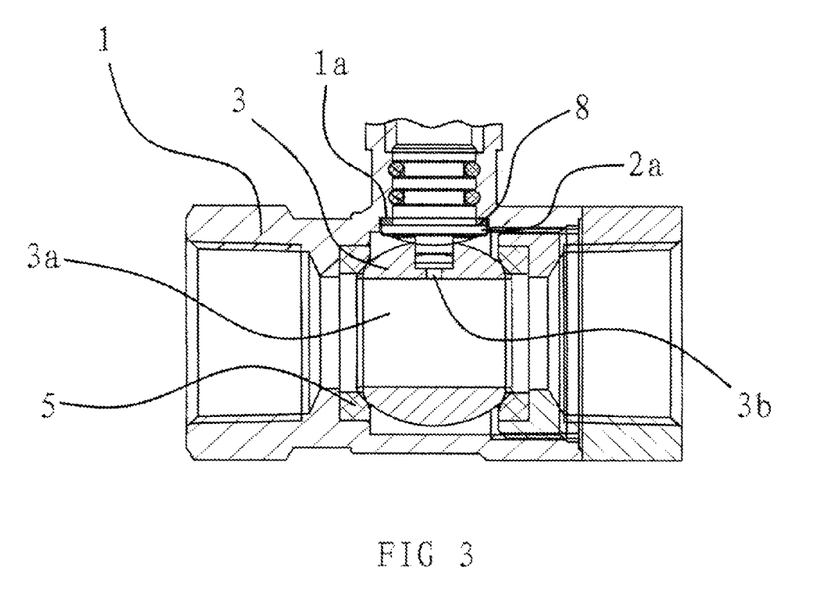
FIG. 3 is a section structural diagram of the valve body of the electric floating ball valve according to the invention.

As shown in FIGS. 1, 2 and 3, the valve core 3 is positioned within the valve body 1, the drive mechanism is positioned outside the valve body 1, and the valve stem 2 passes through the valve body 1 and the inner end of the valve stem 2 is linked with the valve core 3. In this embodiment, a gasket 5 is provided between the valve core 3 and the valve body 1. An extending through hole 3a for passing the medium is provided at the center of the valve core 3. A pressure discharge hole 3b is set in the valve core 3, for communicating the through hole 3a with the internal cavity of the valve body 1.

Figure 9:
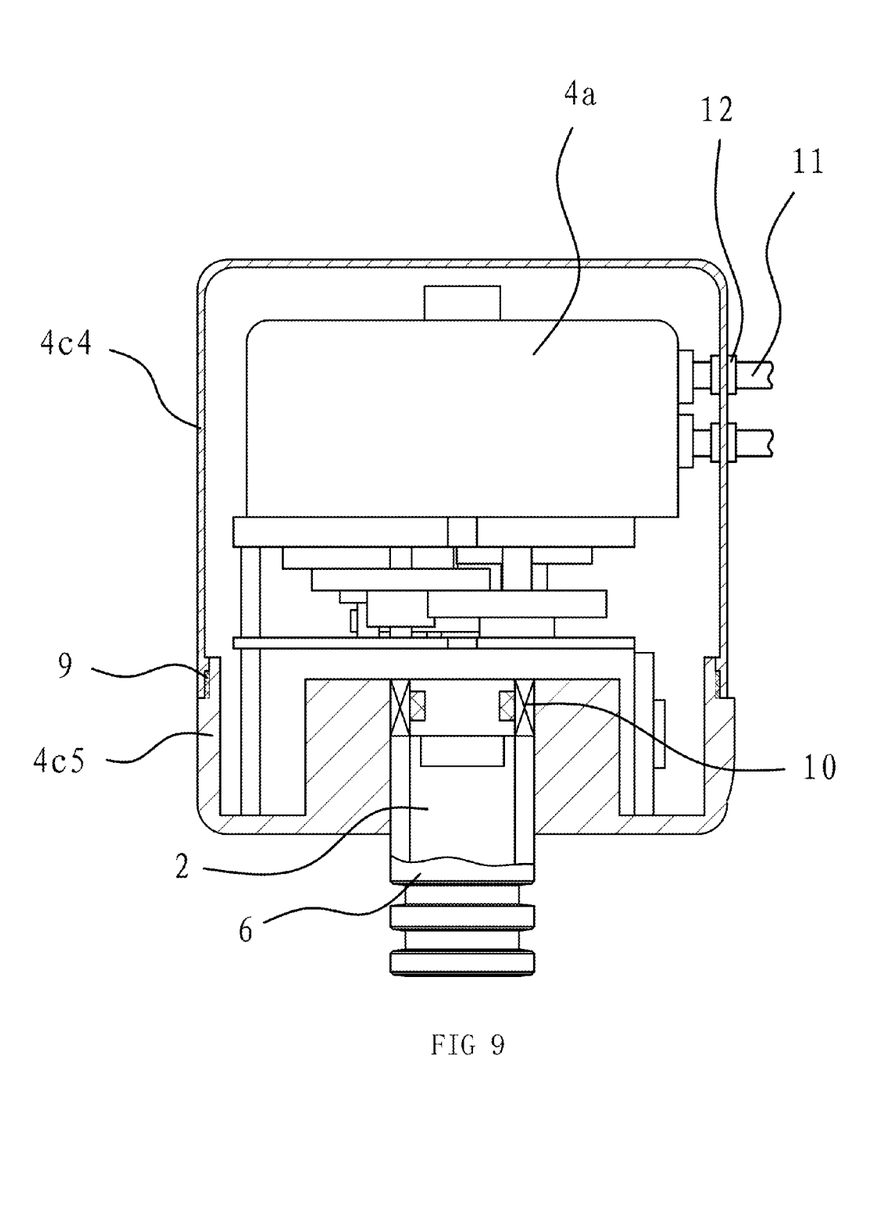
FIG. 9 is a sectional structural diagram of the drive mechanism of the electric floating ball valve according to the invention.

The drive mechanism 4 includes a housing 4c, a motor 4a provided within the housing and a transmission gear unit 4b, in which the motor 4a is connected with the input end of the transmission gear unit 4b and the output end of the transmission gear unit 4b is connected with the valve stem 2. In this embodiment, the housing 4c includes an upper housing part 4c4 and a lower housing part 4c5. A sealed cavity is formed between the upper housing part and the lower housing part after the upper housing part 4c4 is connected to the lower housing part 4c5. A seal washer 9 is provided at the connection of the upper housing part 4c4 and the lower housing part 4c5. A bearing 10 is further positioned between the lower housing part 4c5 and the valve stem 2. A seal washer is located between the inner side of the bearing 10 and the valve stem 2 for the purpose of sealing, referring to FIG. 9.

Figure 4:
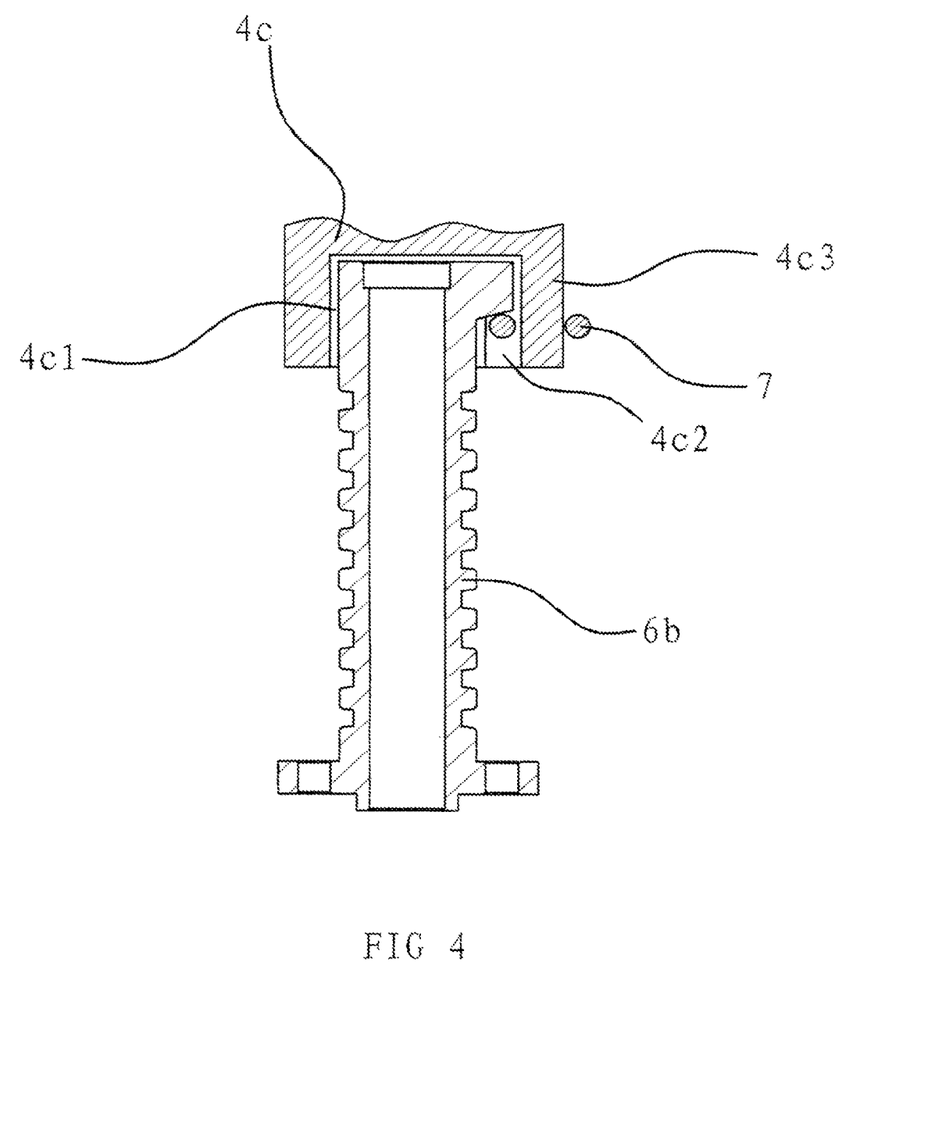
FIG. 4 is a structural diagram of the connection of the heat sink and the drive mechanism of the electric floating ball valve according to the invention.
Figure 5:
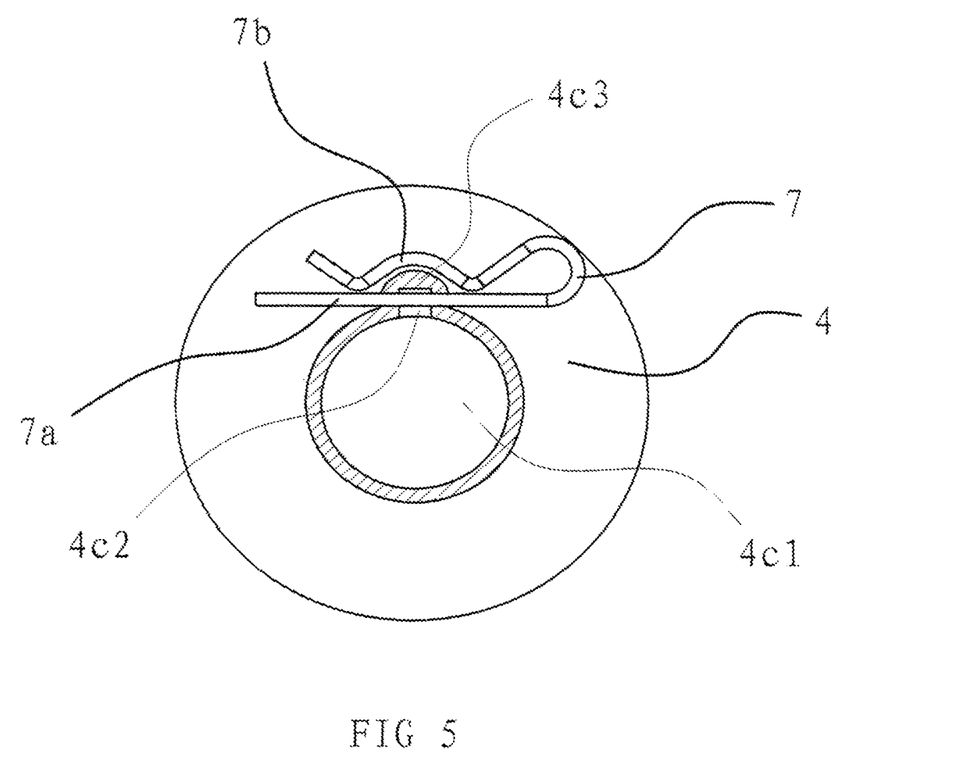
FIG. 5 is a structural diagram of the connection of the heat sink and the drive mechanism of the electric floating ball valve according to the invention in another direction.
Figure 6:
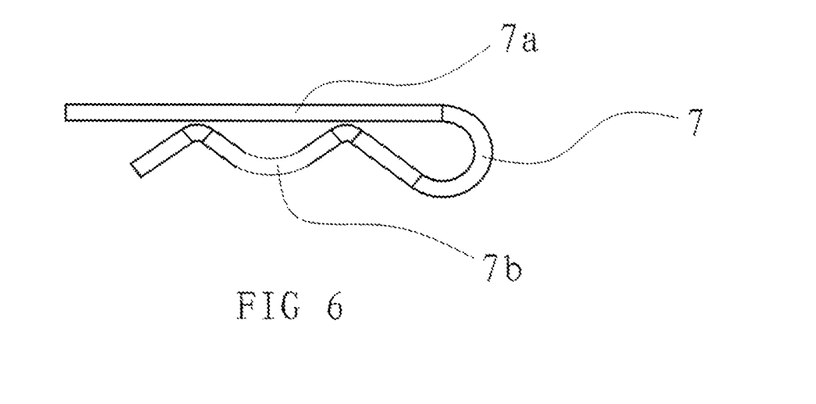
FIG. 6 is a structural diagram of the clip connector of the electric floating ball valve according to the invention.
Figure 7:
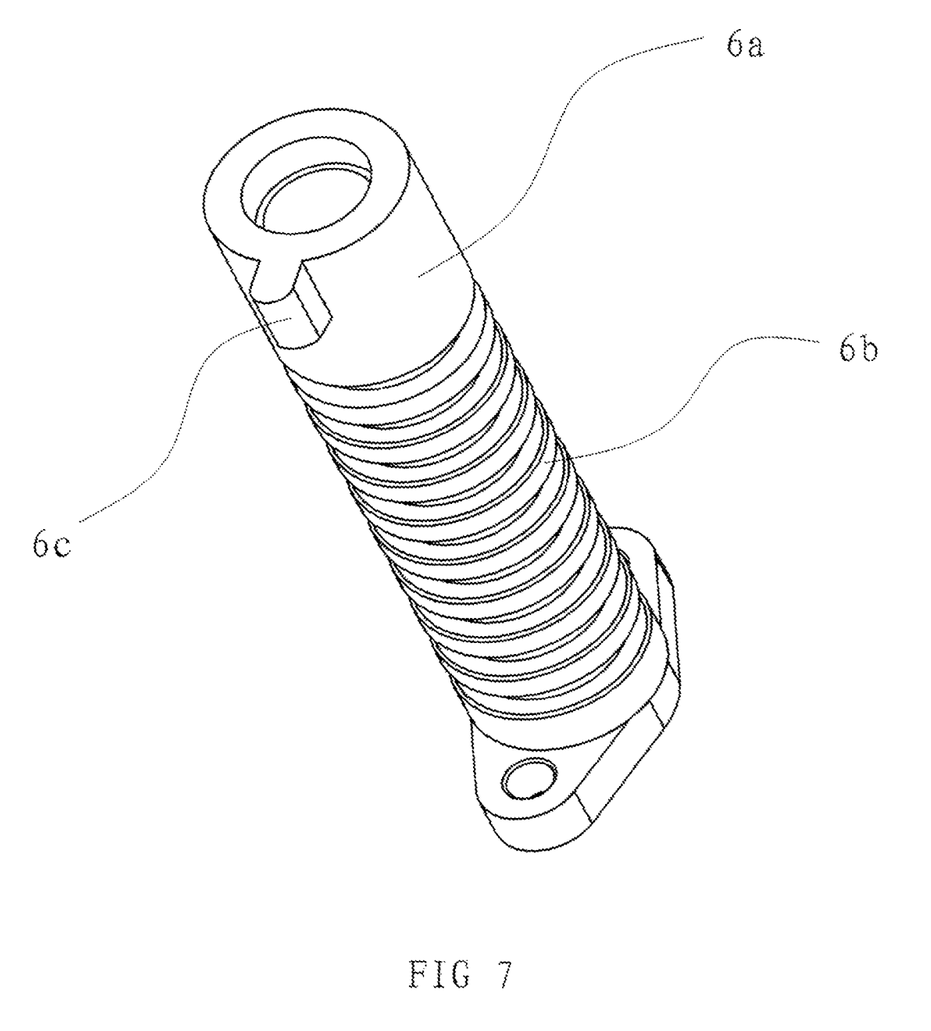
FIG. 7 is a three dimensional structural diagram of the heat sink of the electric floating ball valve according to the invention.
Figure 8:
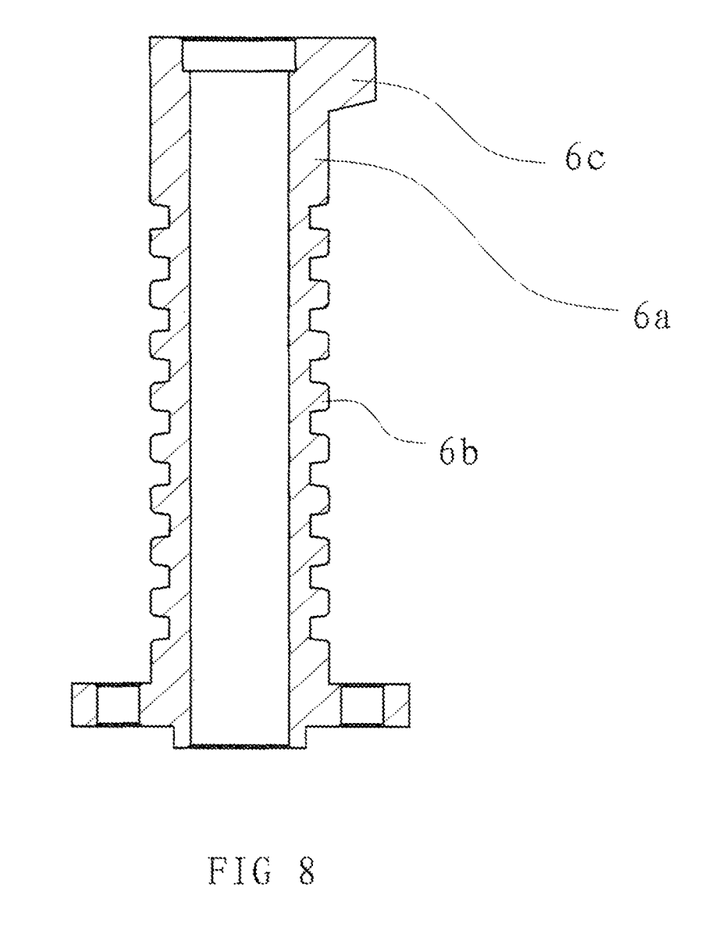
FIG. 8 is a sectional structural diagram of the heat sink of the electric floating ball valve according to the invention.

As shown in FIGS. 4, 5 and 6, a cylindrical heat sink 6, made of metallic materials, is covered on the external side of the valve stem 2. The heat sink 6 has a cylindrical body 6a and several radiating fins 6b on the external side of the body 6a. The body 6a of the heat sink 6 is fixed to the valve body 1 at a first end, and is connected with the housing 4c of the drive mechanism 4 at the second end. As shown in FIGS. 7 and 8, the radiating fins 6b are annular and protrude along the circumference of the body 6a. As alternatives, the radiating fins 6b are strip-shaped and protrude along the axial direction of the body 6a, as required by actual circumstances. In this embodiment, the length of the heat sink 6 is 7 centimeters, and provided with eight radiating fins 6b with the spacing between two adjacent radiating fins 6b being 2 centimeters, referring to FIGS. 7 and 8.

A mounting hole 4c1 is provided at the housing 4c of the drive mechanism 4. The second end of the body 6a other than the first one fixed to the valve body 1 is placed at the mounting hole 4c1. A clip connector 7 is provided between the housing 4c and the body 6a to fixedly connect the two.

A notch 4c2 concave in the axial direction is provided on the wall of the mounting hole 4c1 of the housing 4c. A projected shoulder 6c is set on the external side at the second end of the body 6a, which is matched with the notch 4c2. Said clip connecter 7 extends through the notch 4c2, and the shoulder 6c is positioned between the housing 4c and the clip connector 7. A projected edge 4c3 is located at the external side of the housing 4c corresponding to the notch 4c2. The said clip connector 7 is U-shaped and elastic. A connecting part 7a for extending through the notch 4c2 is set at one side of the opening of the clip connector 7. The other side of the opening of the clip connector 7 has a press fitting element 7b matched with the projected edge 4c3. In said embodiment, the clip connector 7 is made of metallic materials and could also be made from plastic materials as required by actual circumstances.

During operation of the electric floating ball valve, the motor 4a of the drive mechanism 4 is turned to drive the valve stem 2 and the valve core 3 to rotate through the transmission gear unit 4b, so as to achieve the opening and closing operations of the electric floating ball valve. As high temperature steam medium passes through the valve body 1, the valve stem 2 has a quite high temperature. The temperature of the valve stem 2 could be quickly decreased with the heat sink 6, which prevents over high temperature being transmitted to the drive mechanism 4.

Furthermore, due to the elasticity of the clip connector 7, the press fitting element 7b of the clip connector 7 is embedded onto the shoulder 6c to maintain the locking state. In this state, the heat sink 6 is fixed on the housing 4c of the drive mechanism 4 in the circumferential and axial directions. An external force could be applied to stretch out the U-shaped opening of the clip connector during disassembling, so as to take the clip connector 7 away from the housing 4c in a convenient manner. Meanwhile, the valve stem 2 has a projected seal step 2a thereon. A seal seat 1a is provided within the valve body 1 corresponding to the seal step 2a. A seal ring 8 is covered on the valve stem 2 and placed between the seal step 2a and the seal seat 1a.

In addition, the servo actuation signal could be used to control the period during which the motor is powered on. In this regards, the motor consumes power only in the process of turning on and off, in which case the motor would not get hot even in the situations of being completely sealed. In the meantime, where the valve core of the valve is blocked, the motor would not be destroyed with the aid of the said servo actuation signal when the valve stem could not rotate. Furthermore, the motor is provided with a overheat protection circuit. As such, the power supply would be automatically switched off when the motor temperature is extraordinarily high, and the motor could be prevented from being damaged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as valve body 1, valve stem 2 and drive mechanism 4, the other similar terms could also be used. These terms are merely used to describe and explain the essence of the invention more conveniently, and any limitation to said terms is regarded as departing from the spirit of the invention.

LIST OF REFERENCE NUMERALS 1 valve body
1a seal seat
2 valve stem
2a seal step
3 valve core
3a through hole
3b pressure discharge hole
4 drive mechanism
4a motor
4b transmission gear unit
4c housing
4c1 mounting hole
4c2 notch
4c3 projected edge
4c4 upper housing part
4c5 lower housing part
5 gasket
6 heat sink
6a body
6b radiating fin
6c shoulder
7 clip connector
7a connecting part
7b press fitting element
8 seal ring
9 seal washer
10 bearing
11 wire
12 sealing element

What is claimed is:

1. An electric floating ball valve, comprising:
a valve body (1);
a valve stem (2) that passes through the valve body (1), the valve stem (2) having an inner end and an outer end;
a valve core (3) positioned within the valve body (1), the inner end of the valve stem (2) is linked with the valve core (3);
a drive mechanism (4) placed outside the valve body (1), the drive mechanism (4) is connected with the outer end of the valve stem (2) and drives the valve stem (2) to rotate;
a housing (4c) of the drive mechanism (4) having an upper housing part (4c4) and a lower housing part (4c5), a sealed cavity is formed between the upper housing part (4c4) and the lower housing part (4c5) when the upper housing part (4c4) is connected to the lower housing part (4c5) and a seal washer (9) is provided at the connection of the upper housing part (4c4) and the lower housing part (4c5);
a motor (4a) provided within the housing (4c);
a transmission gear unit (4b) having an input end and an output end, the input end of the transmission gear unit (4b) is connected to the motor (4a), the output end of the transmission gear unit (4b) is connected to the valve stem (2); and
a cylindrical heat sink (6) including a cylindrical body (6a) made of metallic materials, the heat sink (6) fixedly connected to the valve body (1), the heat sink (6) having a length of 8 to 15 centimeters;
wherein an external side of the valve stem (2) is covered with the heat sink (6); and
wherein a projected edge (4c3) is set at an external side of the housing (4c) corresponding to a notch (4c2), a clip connector (7) is U-shaped and elastic, a connecting part (7a) for extending through the notch (4c2) is located at one side of the opening of the clip connector (7), and the other side of the opening of the clip connector (7) has a press fitting element (7b) matched with the projected edge (4c3).

2. An electric floating ball valve, comprising:
a valve body (1);
a valve stem (2) that passes through the valve body (1), the valve stem (2) having an inner end and an outer end;
a valve core (3) positioned within the valve body (1), the inner end of the valve stem (2) is linked with the valve core (3);
a drive mechanism (4) placed outside the valve body (1), the drive mechanism (4) is connected with the outer end of the valve stem (2) and drives the valve stem (2) to rotate; and
a cylindrical heat sink (6) including a cylindrical body (6a) made of metallic materials with a first end and a second end, the heat sink (6) fixedly connected to the valve body (1) at the first end of the heat sink (6);
wherein an external side of the valve stem (2) is covered with the heat sink (6);
wherein a mounting hole (4c1) is provided at a housing (4c), the second end of the cylindrical body (6a) is placed at the mounting hole (4c1), and a clip connector (7) is provided between the housing (4c) and the cylindrical body (6a) to fixedly connect the housing (4c) and the cylindrical body (6a);
wherein a notch (4c2) concaved in an axial direction extending radially from the mounting hole (4c1) is provided on a wall of the mounting hole (4c1) of the housing (4c), a projected shoulder (6c) is set on an external side of the second end of the cylindrical body (6a) and is matched with the notch (4c2), the clip connecter (7) extends through the notch (4c2), and the shoulder (6c) is positioned between the housing (4c) and the clip connector (7); and
wherein a projected edge (4c3) is set at the external side of the housing (4c) corresponding to the notch (4c2), the clip connector (7) is U-shaped and elastic, a connecting part (7a) for extending through the notch (4c2) is located at one side of the opening of the clip connector (7), and the other side of the opening of the clip connector (7) has a press fitting element (7b) matched with the projected edge (4c3).

3. An electric floating ball valve, comprising:
a valve body (1);
a valve stem (2) that passes through the valve body (1), the valve stem (2) having an inner end and an outer end;

a valve core (3) positioned within the valve body (1), the inner end of the valve stem (2) is linked with the valve core (3);

a drive mechanism (4) placed outside the valve body (1), the drive mechanism (4) is connected with the outer end of the valve stem (2) and drives the valve stem (2) to rotate; and a cylindrical heat sink (6) including a cylindrical body (6a) made of metallic materials with a first end and a second end, the heat sink (6) fixedly connected to the valve body (1) at the first end of the heat sink (6);

wherein an external side of the valve stem (2) is covered with the heat sink (6);

wherein a mounting hole (4c1) is provided at a housing (4c), the second end of the cylindrical body (6a) is placed at the mounting hole (4c1), and a clip connector (7) is provided between the housing (4c) and the cylindrical body (6a) to fixedly connect the housing (4c) and the cylindrical body (6a);

wherein a notch (4c2) concaved in an axial direction extending radially from the mounting hole (4c1) is provided on a wall of the mounting hole (4c1) of the housing (4c), a projected shoulder (6c) is set on an external side of the second end of the cylindrical body (6a) and is matched with the notch (4c2), the clip connecter (7) extends through the notch (4c2), and the shoulder (6c) is positioned between the housing (4c) and the clip connector (7);

wherein the heat sink (6) includes several radiating fins (6b) set on the external side of the cylindrical body (6a); and wherein a projected edge (4c3) is set at the external side of the housing (4c) corresponding to the notch (4c2), the clip connector (7) is U-shaped and elastic, a connecting part (7a) for extending through the notch (4c2) is located at one side of the opening of the clip connector (7), and the other side of the opening of the clip connector (7) has a press fitting element (7b) matched with the projected edge (4c3).

* * * * *